W. F. HEYWOOD.
Distance Register for Vehicles.
No. 201,608. Patented March 26, 1878.
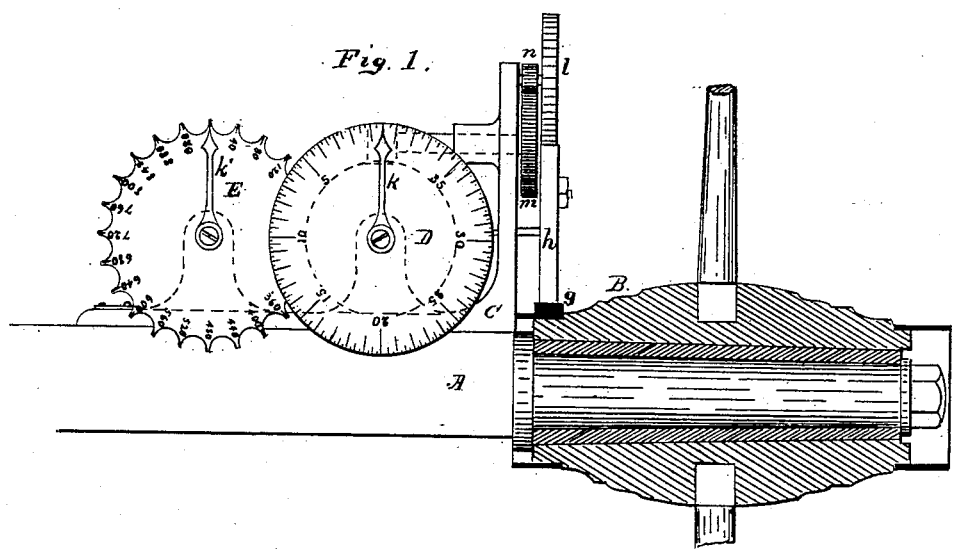
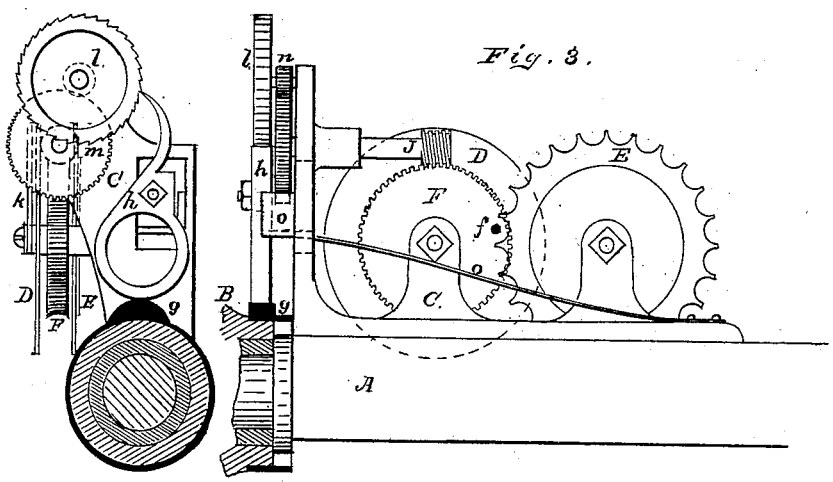

UNITED STATES PATENT OFFICE.

WILLIAM F. HEYWOOD, OF WOONSOCKET, RHODE ISLAND.

IMPROVEMENT IN DISTANCE-REGISTERS FOR VEHICLES.

Specification forming part of Letters Patent No. 201,608, dated March 26, 1878; application filed January 15, 1878.

*To all whom it may concern:*

Be it known that I, WILLIAM F. HEYWOOD, of the town of Woonsocket, in the county of Providence and State of Rhode Island, have invented a new and valuable Improvement in a Register of Distances for Vehicles; and I do hereby declare that the following is a full, clear, and exact description of the construction and operation of the same.

Figure 1 of the accompanying drawing is a front view of my invention; Fig. 2, an end, and Fig. 3 a back, view.

The object of my invention is for the purpose of ascertaining at a glance the number of miles or parts that a carriage or other vehicle to which it may be attached have been propelled, and which the inventor considers will be of great benefit to stable-keepers in particular.

In the drawing, A represents the axle of a carriage, to which the recorder is attached; B, the hub of carriage-wheel. On the hub B is a cam, $g$, and as the carriage is propelled forward this cam operates a pawl, $h$, at each revolution of the hub or wheel. This pawl is constructed on the spring $o$, Fig. 3, and in such a manner that as the carriage moves forward it acts on the ratchet-wheel $l$, moving it one tooth at each revolution of the carriage-wheel. The pawl $h$ is also constructed in such a manner that if the motion of the carriage is reversed or backed it relieves the pawl $h$ from the ratchet-wheels, and therefore stops all action on other parts of the register.

Connected to the ratchet-wheel $l$ are small gears $n$ and $m$, and from $m$ the worm and shaft J are attached, operating the worm-wheel F and dial D.

On the stud of the worm-wheel F is the stationary hand or pointer $k$, which always retains the same position.

The dial D revolves, and is graduated to conform with the size of carriage-wheel, so that in each mile or part thereof that the carriage has been propelled it can be read from the dials at a glance.

When forty miles have been traveled, the dial D makes a complete revolution and acts on a second dial, E, by means of the pin $f$, Fig. 3, which is fixed to the worm-wheel F, and moves in the grooves or teeth on the dial E. This dial is also so graduated that at one revolution of the dial D it registers forty miles on this dial, and at two revolutions, eighty miles; three, one hundred and twenty miles, and so on to nine hundred and sixty miles.

What I claim, and wish to secure by Letters Patent, is—

The combination, in a register of distances for vehicles, substantially as described, of the cam $g$, pawl and spring $h$ and $o$, stationary hand or pointer $k$ $k'$, and revolving dials D and E.

In testimony that I claim the above I have hereunto subscribed my name in the presence of two witnesses.

WILLIAM F. HEYWOOD.

Witnesses:
WM. F. TESTON,
GEORGE A. WILBUR.